Dec. 10, 1946.  L. D. HARRISON  2,412,457
VALVE ACTUATING MECHANISM
Filed Aug. 25, 1941  7 Sheets-Sheet 2

INVENTOR
Laurence D. Harrison

Dec. 10, 1946.    L. D. HARRISON    2,412,457
VALVE ACTUATING MECHANISM
Filed Aug. 25, 1941    7 Sheets-Sheet 3
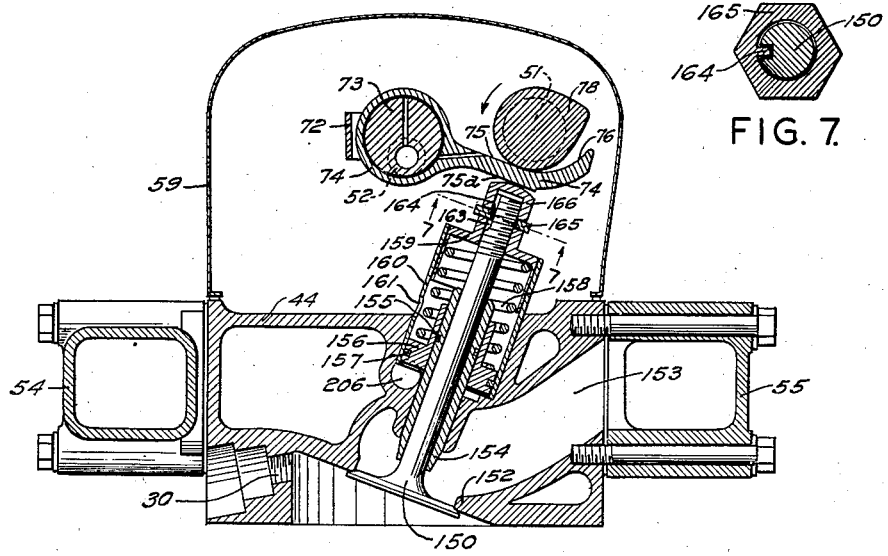
FIG. 7.
FIG. 6.
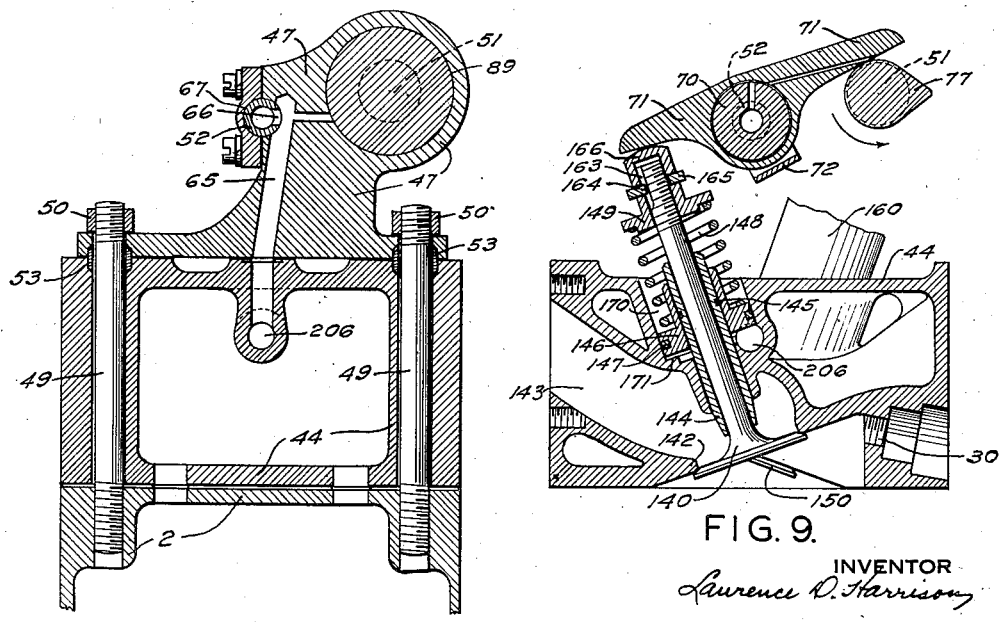
FIG. 8.
FIG. 9.
INVENTOR
Lawrence D. Harrison Dec. 10, 1946.  L. D. HARRISON  2,412,457
VALVE ACTUATING MECHANISM
Filed Aug. 25, 1941  7 Sheets-Sheet 4

INVENTOR.
Laurence D. Harrison

Dec. 10, 1946.   L. D. HARRISON   2,412,457
VALVE ACTUATING MECHANISM
Filed Aug. 25, 1941   7 Sheets-Sheet 5
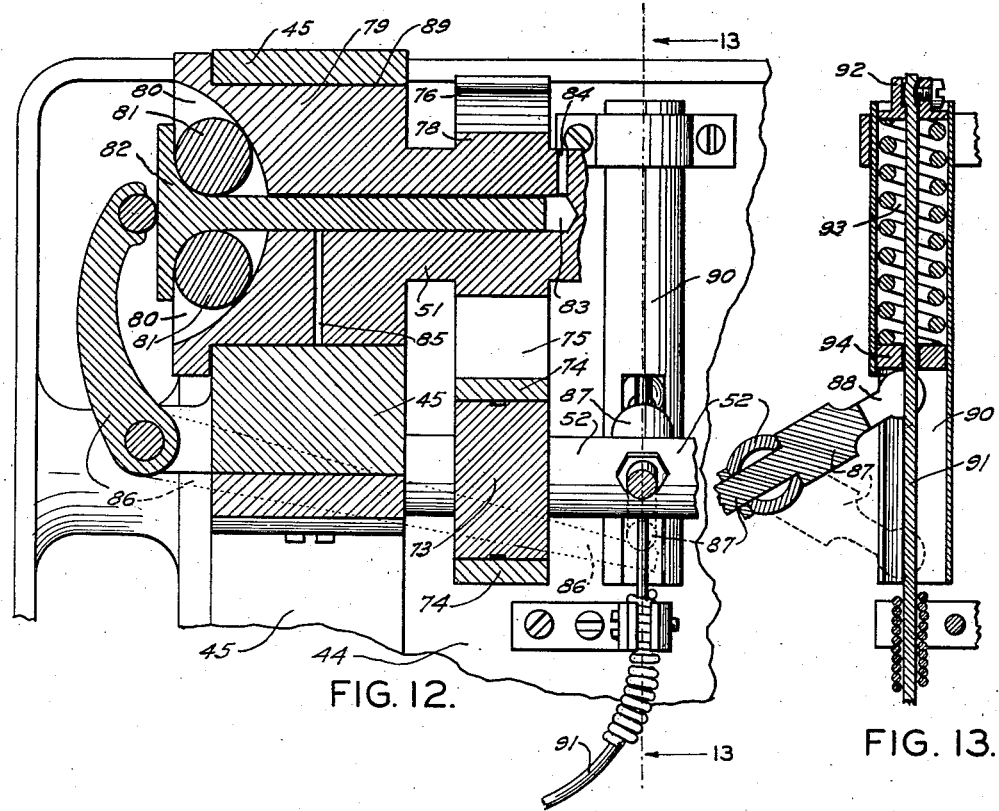
FIG. 12.   FIG. 13.
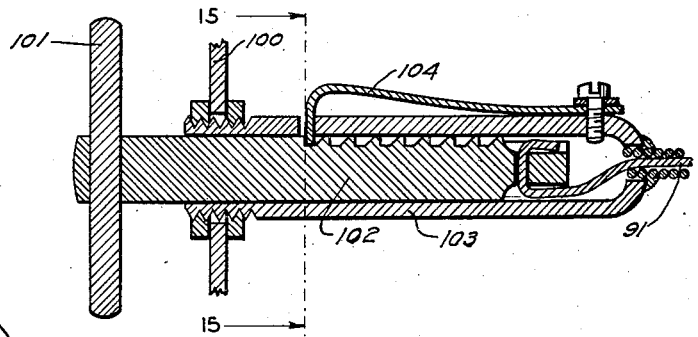
FIG. 14.
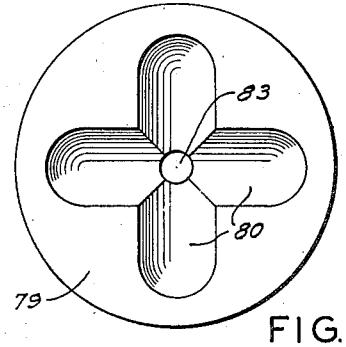
FIG. 15.
FIG. 16.
INVENTOR
Laurence D. Harrison INVENTOR
Laurence D. Harrison Patented Dec. 10, 1946

2,412,457

UNITED STATES PATENT OFFICE 2,412,457

VALVE ACTUATING MECHANISM

Laurence D. Harrison, Maricopa County, Ariz.

Application August 25, 1941, Serial No. 408,143

5 Claims. (Cl. 123—90K3)

This invention pertains to internal combustion engines of the constant volume type wherein the charge is ignited by an electric spark.

This invention is an internal combustion engine that operates on a selective expansion ratio which may be as high as 1 to 25 and which correspondingly determines the volume of the compression space, to which are correlated a fixed point of ignition and certain varying volumes of intake charge, to the extent that as the compression space decreases in volume the fixed point of ignition approaches top center and the varying volumes of intake charge decrease. The fixed point of ignition is in the proximity of top center. The volume of intake charge retained in the cylinder is automatically varied in relation to the speed of the engine and correspondingly adjusted relative to the temperature of the engine and the pressure of the atmosphere so as to retain in the cylinder a volume of intake charge which will raise the compression pressure at the fixed point of ignition as the speed of the engine increases in order to decrease the burning time of the charge as the time available to burn the charge decreases. The varying volumes of charge are such as will burn without critical detonation at the respective engine speeds at which they occur. The reduced burning time provides higher peak expansion pressures and the reduced compression space provides expansion to a lower pressure and temperature.

Heretofore, internal combustion engines using spark ignition have had no way to confine ignition and burning of the charge, with the resultant pressure rise, to a relatively small number of degrees of crankshaft rotation in the proximity of top center.

In the ordinary engine, a reduction in the volumetric efficiency of the charge, whether from high speed, high altitude, high degree of heat, or restriction to induction with the carbureter throttle valve is such that the resultant charge contains a higher percentage of residuum gas, and provides a lower compression pressure. Both of these seriously retard the speed of flame travel, which determines the length of time required to effectively burn the charge, and this is of the utmost importance in determining the rate of pressure rise due to the burning of the charge.

In an endeavor to obtain the most favorable peak presurse at an early degree on the power stroke with the ever changing uncontrolled compression pressures that occur in the ordinary engine, various ways have been used in changing the degree of crank shaft rotation at which the electric spark occurs in an attempt to coordinate a variable point of ignition with a variable uncontrollable compression pressure, all of which resulted in advancing the point of ignition into a slower burning range of lower compression pressures and temperatures that were more uncertain of uniform ignition and burning. This condition increases the degrees of crank shaft rotation over which ignition and burning of the charge takes place, and as concerns the speed of revolution of an engine, amounts to increasing the time required to burn the charge as the time available to burn the charge decreases. At extreme high speed ignition takes place greatly in advance of top center and the additional work required to move the piston on the latter portion of the compression stroke, against the additional pressure due to burning which is in excess of the pressure of compression, represents a net loss in power. The longer periods of time required to burn the charge, from these advanced points of ignition in the slow burning range of compression pressure and temperature, and at the increased temperature and pressure resulting from burning, preclude attainment of higher peak pressures that otherwise could be reached if it were possible to effectively burn the charge in a shorter period of time. The resulting peak pressures that are attained under the most favorable conditions seldom reach half the value of the theoretical.

Under working conditions the ordinary engine will discard via the exhaust, heat of a value, that at times will exceed three times the amount of heat that is converted into work. Combustion is far from complete as is evidenced by the presence of flame in the exhaust, which is at such high pressures as to require the exhaust period to begin greatly in advance of bottom dead center to relieve such pressure prior to commencement of the exhaust stroke.

Thus instead of the charge being burned near the top of the power stroke and providing high pressures to expand as the piston is forced down, burning of the charge in the ordinary engine continues throughout the power stroke, providing only such working pressures as delayed burning in an increasing volume with decreasing temperature and pressure will supply, and this burning is still in progress when the exhaust period commences.

In view of the foregoing, I have provided an engine operative on a selective expansion ratio whereby the volume of the compression space is determined, and to which are correlated a fixed degree for the occurrence of the electric spark and certain automatically regulated volumes of intake charge, and the objects of the invention are:

First, to provide an engine of the type herein concerned operable on fractional volumes of intake charge relative to the piston displacement which are varied in relation to engine speed and temperature and to atmospheric pressure conjunctive to minimize power requirements during the compression stroke, provide higher power multiplication factors from a given volume of charge under all operating conditions, and expand the burned charge to a lower pressure and temperature than possible with engines heretofore constructed;

Second, to provide an engine of the type herein concerned operable on fractional volumes of intake charge relative to the piston displacement which are varied in relation to engine speed to vary the compression pressure at a fixed point of ignition in the proximity of top center whereby the burning time of the charge, confined in a reduced volume of compression space shaped and proportioned to burn a maximum of the volume of charge therein with a minimum distance of flame travel, is greatly reduced which provides correspondingly higher peak pressures and temperatures with the expansion therefrom carried to much lower pressures and temperatures, and wherein the fractional volumes of charge are automatically increased and decreased relative to the temperature of the engine and to the pressure of the atmosphere, to maintain proper relation of the compression pressure to the speed of the engine;

Third, to provide an engine of the type herein concerned, wherein the expansion ratio of the clearance volume is selective and not governed by the fuel to be used, and wherein the volumetric efficiency of the intake charge is determined by the burning characteristics of the fuel to be used in conjunction with the clearance volume selected, and wherein the volumetric efficiency of the charge is increased and decreased with increasing and decreasing speed of the engine respectively and the volume of the intake charge is increased and decreased with increasing and decreasing temperature of the engine respectively and increased and decreased with decreasing and increasing pressure of the atmosphere respectively to maintain within the cylinder a volume of charge of the same approximate volumetric efficiency at a given speed of engine revolution irrespective of temperature of the engine and pressure of the atmosphere so that the compression pressure is varied in relation to the speed of the engine to provide burning of the charge in the shortest possible time to avail of the additional power from higher peak pressures corresponding with the decreased burning time and greater expansion of charge;

Fourth, to provide an engine of the type herein concerned, wherein the expansion ratio of the compression space is selective and not governed by the burning characteristics of the fuel to be used, and having automatic means to vary the volume of the intake charge retained in the cylinder in relation to the speed of the engine, the volumetric efficiency of the varying volumes, being governed by the burning characteristics of the fuel to be used in conjunction with the compression space and the engine speed, increases as the speed of the engine increases, and having co-active automatic means to adjust the volume relative to changing pressure of the atmosphere and changing temperature of the engine to retain within the cylinder a volume of intake charge of approximately like volumetric efficiency in relation to speed of the engine, and having manual means to vary the volume of the intake charge retained in the cylinder independently of the automatic means;

Fifth, to provide an engine of the type herein concerned having higher thermal efficiency throughout the entire operating range than engines heretofore constructed;

Sixth, to provide an engine of the type described with a higher effective speed of revolution at greater operating efficiency than engines heretofore constructed;

Seventh, to provide an engine of the type herein concerned that will maintain its sea-level power output at high altitudes;

Eighth, to provide an engine of the type described that will expand the burned charge to approximately atmospheric pressure at maximum full load performance;

Ninth, to provide an engine as herein concerned with a fixed clearance volume and means to vary the volume of the charge retained in the cylinder;

Tenth, to provide an engine of the type herein concerned with automatic means for varying the compression pressure;

Eleventh, to provide an engine of the type herein concerned, with automatic means to vary the volume of the charge retained in the cylinder relative to the temperature of the engine;

Twelfth, to provide an engine of the type herein concerned with automatic means to vary the volume of the charge retained in the cylinder relative to atmospheric pressure;

Thirteenth, to provide an engine of the type described with automatic means to vary the volume of the charge retained in the cylinder relative to the speed of revolution of the engine;

Fourteenth, to provide an engine of the type herein concerned with automatic means to vary the volume of the charge retained in the cylinder;

Fifteenth, to provide an engine of the type herein concerned with automatic co-active means to vary the volume of the charge retained in the cylinder relative to temperature of the engine and pressure of the atmosphere and speed of revolution of the engine;

Sixteenth, to provide an engine of the type herein concerned having automatic co-active means to vary the volume of the charge retained in the cylinder relative to the temperature of the engine and relative to the pressure of the atmosphere;

Seventeenth, to provide an engine of the type herein concerned having automatic co-active means to vary the volume of the charge retained in the cylinder relative to the pressure of the atmosphere and relative to the speed of revolution of the engine;

Eighteenth, to provide an engine of the type herein concerned having automatic co-active means to vary the volume retained in the cylinder relative to temperature of the engine and speed of revolution of the engine;

Nineteenth, to provide an engine of the type herein concerned having manual means to vary the volume of the charge retained in the cylinder;

Twentieth, to provide an engine of the type herein concerned with automatic means to vary the volume of the charge retained in the cylinder and manual means to vary the volume of the charge retained in the cylinder, the manual means being dominant over the automatic means;

Twenty-first, to provide an engine of the type herein concerned with means to vary the valve spring pressure;

Twenty-second, to provide an engine of the type herein concerned with automatic means to vary the valve spring pressure relative to speed of revolution of the engine;

Twenty-third, to provide an engine of the type herein concerned with means to disrupt and absorb valve spring vibrations;

Twenty-fourth, to provide an engine of the type herein concerned with means to greatly produce the time required to burn the charge;

Twenty-fifth, to provide an engine of the type herein concerned with a fixed clearance volume correlated with a fixed point of ignition and such varying volumes of charge as will burn without critical detonation at the respective speed of revolution of the engine at which they occur, and means to vary the volume of charge relative to a change in atmospheric pressure and relative to temperature of the engine and relative to the speed of revolution of the engine, all co-active to maintain high useful compression pressure at the point of fixed ignition in relation to operating conditions.

Other objects will appear hereinafter.

I attain the foregoing objects by means of the mechanism construction and devices illustrated in the accompanying drawings, in which—

Figure 6 is a partial section taken substantially on lines 6—6, Fig. 1 and drawn on a somewhat enlarged scale;

Figure 7 is a section on lines 7—7, Fig. 6;

Figure 8 is a partial section taken substantially on lines 8—8, Fig. 1 and drawn on an enlarged scale;

Figure 9 is a partial sectional elevation taken substantially on lines 9—9, Fig. 1;

Figure 2:
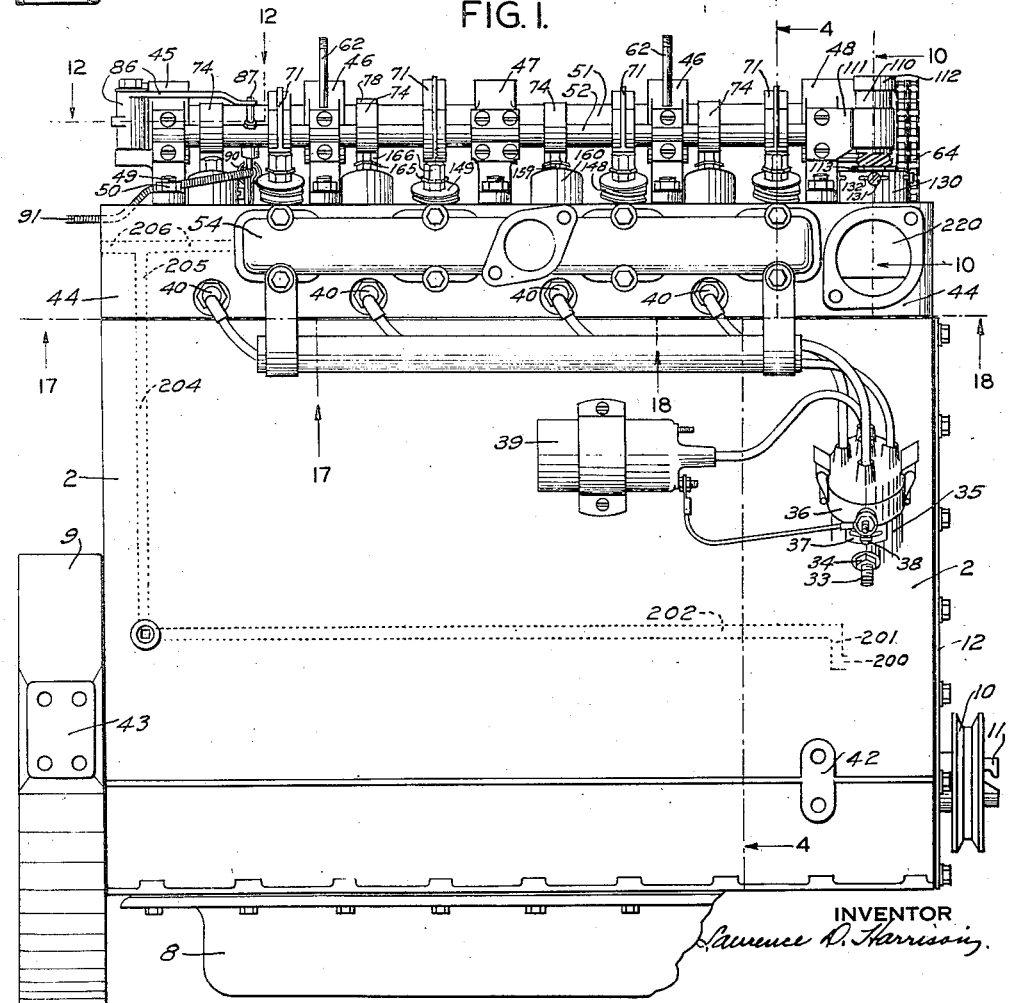
Figure 2 is a partial side elevation thereof.
Figure 10:
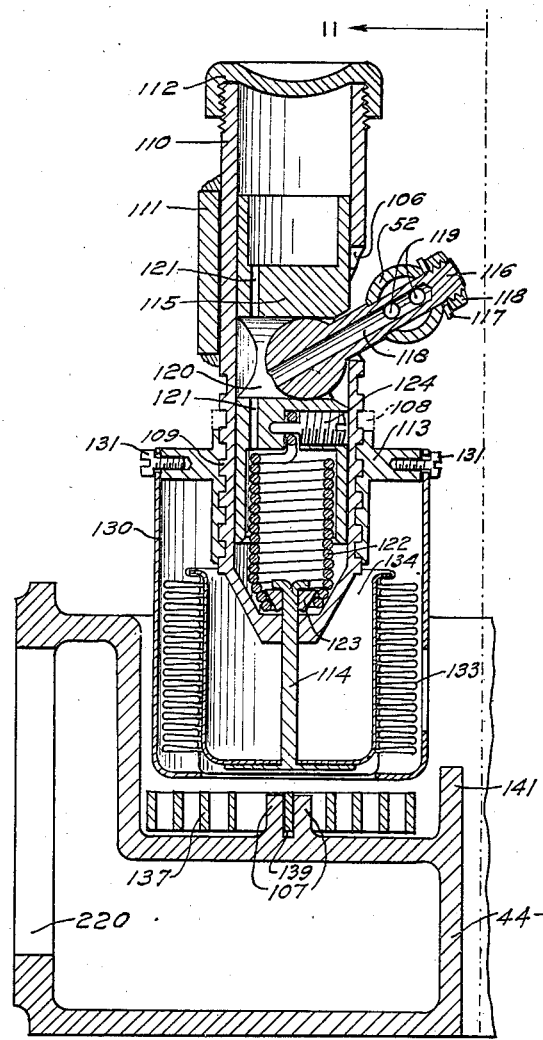
Figure 10 is a fragmentary sectional elevation taken substantially on lines 10—10, Figure 2, of the stabilized speed-atmospherical-thermal regulator, drawn on an enlarged scale.
Figure 11:
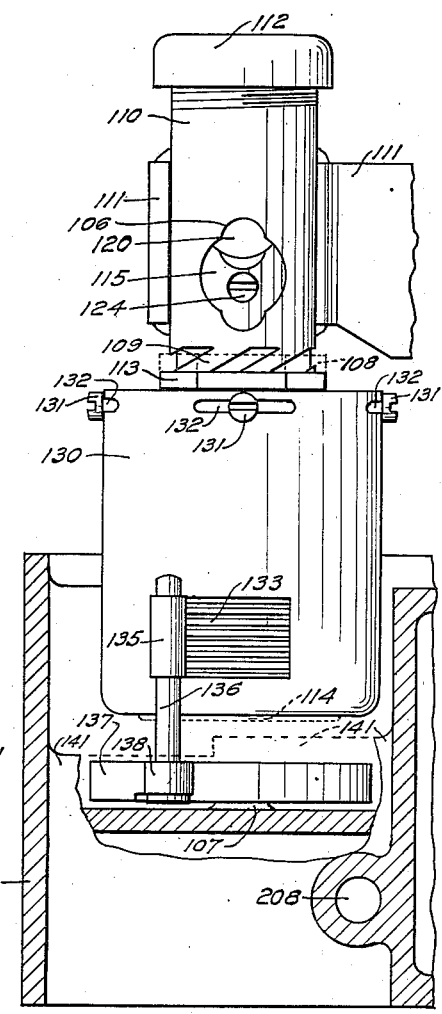
Figure 17:
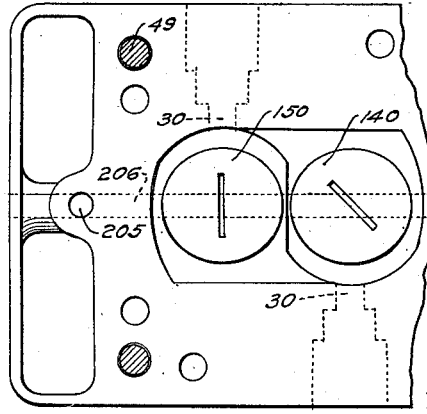
Figure 18:
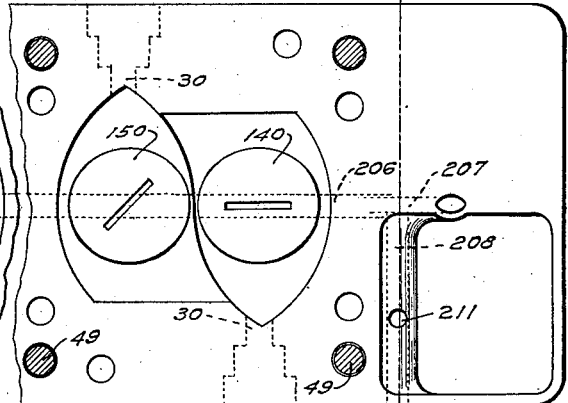
Figure 20:
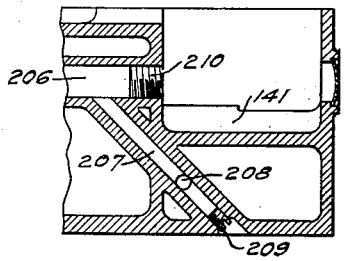
Figure 19:
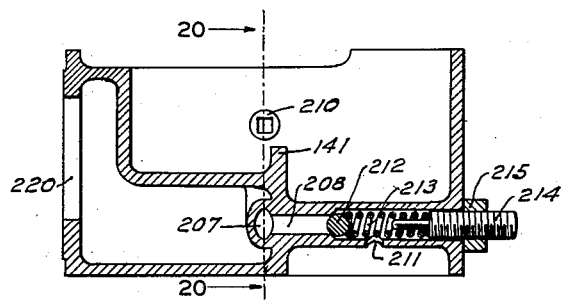
Figure 22:
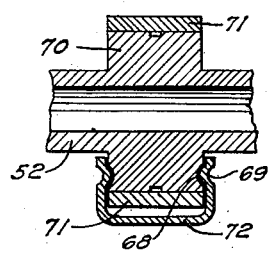
Figure 21:
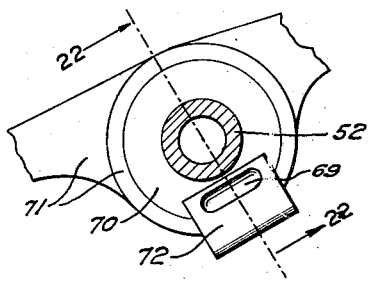
Figure 23:
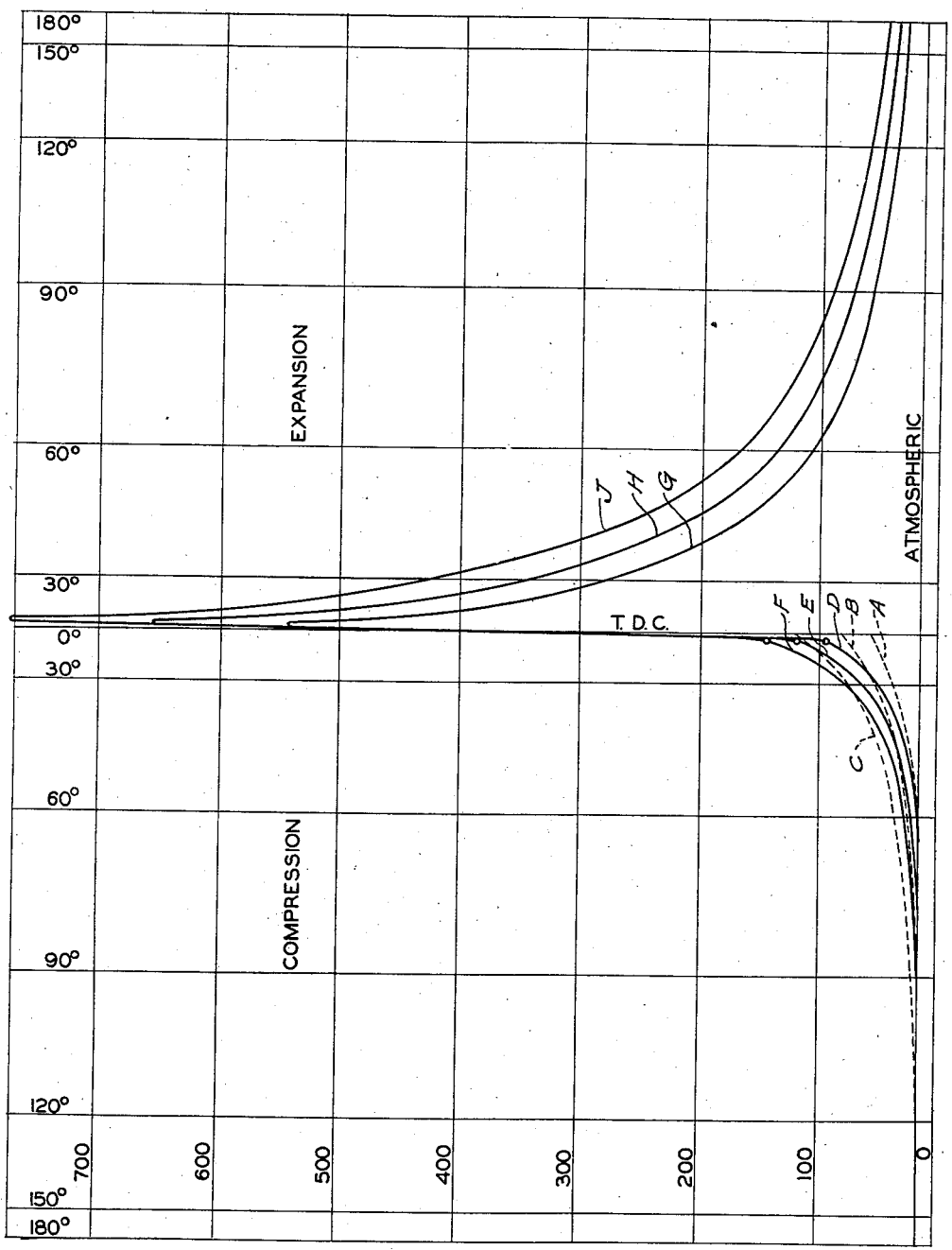

Figure 11 is an elevation taken substantially on lines 11—11, Figure 10, with the adjusting shaft 52 and the ball end bolt 116 removed to show the adjusting unit in the position it occupies at high engine speeds, temperature and at high altitudes;

Figure 12 is an enlarged sectional view of the engine speed co-active adjusting mechanism termed a variable force regulator, taken substantially on lines 12—12, Figure 2;

Figure 13 is a sectional view taken substantially on lines 13—13, Figure 12, showing the interposed manual control;

Figure 14 is a sectional view of the handle end of manual control mechanism;

Figure 15 is a section taken substantially on lines 15—15, Figure 14;

Figure 16 is an elevation of the face of the left end of the cam shaft;

Figure 17 is a partial bottom view drawn on an enlarged scale taken substantially on lines 17—17, Figure 2, showing an exemplification of a cylinder head with a clearance volume such as is used with an expansion ratio of approximately 1 to 25;

Figure 18 is a similar view taken substantially on lines 18—18, Figure 2, showing an exemplification of a cylinder head with a clearance volume such as is used with an expansion ratio of 1 to 11;

Figure 19 is a sectional view taken substantially on lines 19—19, Figure 18;

Figure 20 is a sectional view taken substantially on lines 20—20, Figure 19;

Figure 21 is a fragmentary elevation showing part of a valve rocker arm with a means for maintaining it in place on its bearing;

Figure 22 is a section taken substantially on lines 22—22, Figure 21;

Figure 23 is a compression-expansion chart.

Similar numerals refer to similar parts in the several views.

Figures 3, 4:
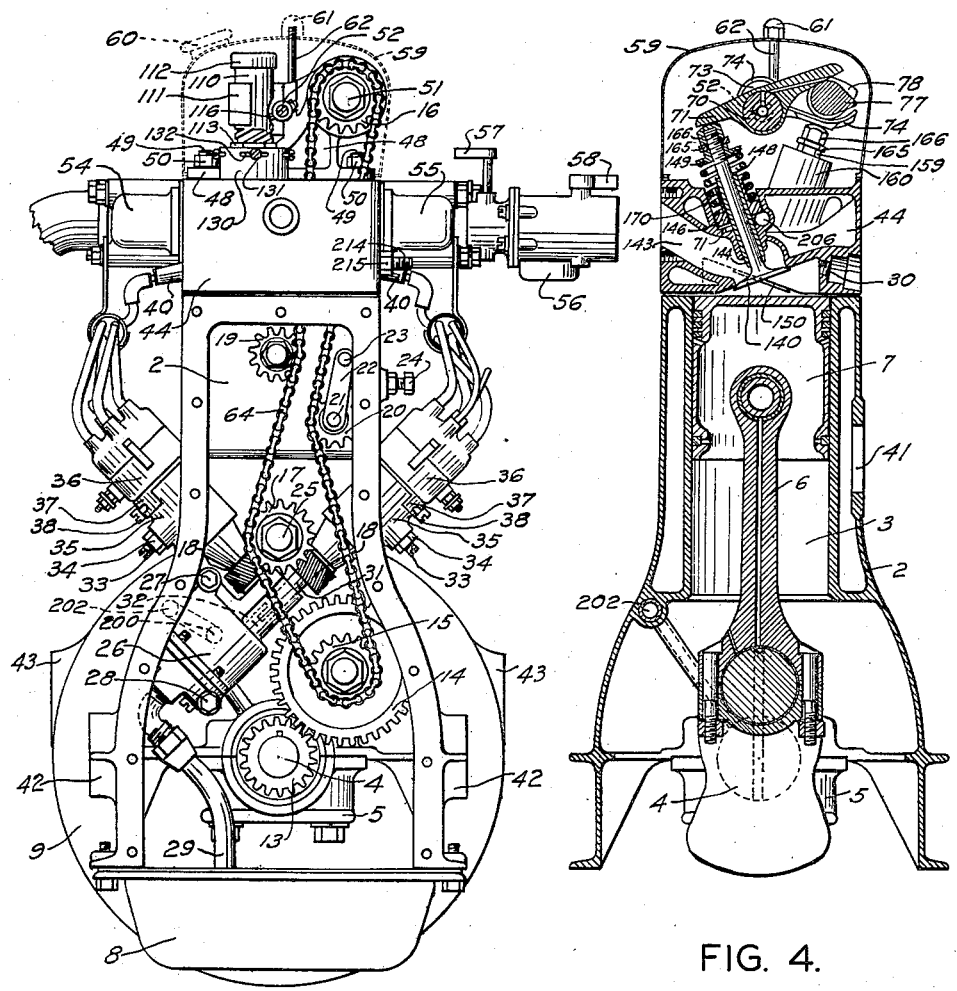
Figure 3 is a front elevation thereof with the front cover plate removed.
Figure 4 is a partial cross sectional elevation taken substantially on lines 4—4, Fig. 2.

Referring to the drawings, 2 represents the cylinder block of a four cylinder four stroke cycle engine, 3 a cylinder, 4 the crankshaft, 5 a main bearing cap, 6 a connecting rod, 7 a piston, 8 the oil pan forming the bottom of the crankcase, 9 a flywheel housing, 10 a V belt pulley, 11 a cranking attachment to the crankshaft for starting, all of which are similar to such parts in conventional use. The cylinder block 2 has a cover plate 12, in the front thereof which is removable to give access to the accessories and their drive mechanism as shown in Figure 3, wherein 13 and 14 are timing gears forming a two to one reduction from crankshaft speed, sprocket 15 is operatively connected to gear 14 and through the means of the timing chain 64 rotates sprockets 16 and 17 at a like speed of revolution or one-half crankshaft speed. Sprocket 19 is a guide sprocket, sprocket 20 is free to rotate on the pin 21, carried in the bracket 22 which is pivoted on pin 23 which has one end secured to the cylinder block casting 2. The position of bracket 22 may be altered by the bolt 24 to properly tension the timing chain 64. The spindle 25 is attached to cylinder block casting 2 and provides a support for rotation of the sprocket 17, which has a spiral gear operatively attached thereto adapted to operate the distributor gears 18 to rotate at one-half crankshaft speed. 26 is a gear tooth lubrication pump affixed to the cylinder block casting 2 with bolts 27 and 28. 29 is an intake oil line communicating with the oil supply line drilled in the cylinder block casting 2 as indicated by the dotted lines and connection is at the dotted circle 200. The oil pump 26 is driven by distributor shaft 31, making a slip joint connection with the pump drive shaft 32, as indicated by the dotted lines at Figure 3.

Figure 1:
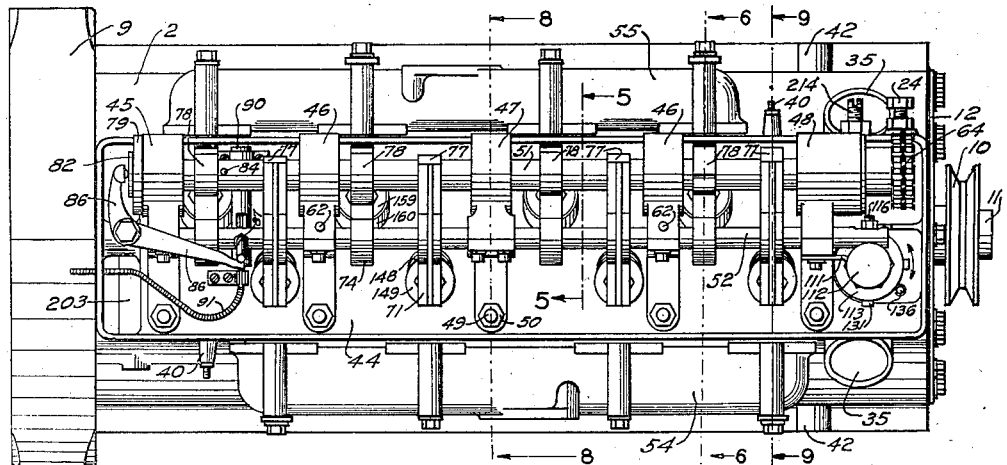
Figure 1 is a partial plan view of a four cylinder engine provided with one type of my improved construction.

The distributor receptacles 35 are a part of the cylinder block casting 2. The screws 33 secure the distributors in position, and 34 is a lock nut thereon. The distributor bases 36 have a shield 37 affixed thereto and are rotative therewith; the screws 38 provide for manual adjustment of the ignition and for securing the timing in a fixed position. Condensers are contained within the distributors and operatively connected thereto. 39 is a coil with provision for connection to a suitable electric current to supply satisfactory spark ignition under high compression pressures. 40 indicates conventional spark-plugs suitably connected as shown to provide spark ignition to the cylinders, the spark of the two plugs of each cylinder being simultaneous. 41, Figure 4, is an inlet opening in the cylinder block 2 for the cooling liquid. 42 and 43, Figures 1, 2 and 3, form places of attachment for mounting the engine.

Referring particularly to Figures 1, 2 and 3, 44 is a cylinder head casting, 45, 46, 47 and 48 are cam shaft supporting brackets which are affixed on the cylinder head casting 44, and held in place by the cylinder head studs 49 and cylinder head nuts 50. These cam shaft supporting brackets 45, 46, 47 and 48 support the cam shaft 51, and the adjusting shaft 52, and provide bearings 89 and 67 respectively; each group being maintained in perfect alignment. The holes in the cylinder head casting 44 and the respective holes in the cam shaft supporting brackets 45, 46, 47 and 48, that receive the cylinder head studs 49, are precision bored and then counterbored to receive the alignment thimbles 53, which have ample tolerance within their interior to allow for customary variations in stud alignment, while their exterior forms a close fit with the respective counterbores (see Figure 8).

Referring particularly to Figure 3, 54 is an exhaust manifold, 55 is an intake manifold, 56 is a carburetor which is connected with a source of fuel supply, lever 57 operates a conventional throttle valve in the conventional manner, lever 58 operates a conventional choke valve in the conventional manner. 59 represents a cover to enclose the mechanism mounted on the head casting 44, and 60 indicates the position of an oil filler and breather. Cover 59 is held in place by the nuts 61, attached to bolts 62 on brackets 46.

The crankshaft 4 rotates clockwise when looking at the engine from the front, which with the arrangement shown in Figure 3, imparts counterclockwise rotation to the camshaft 51, on which is mounted sprocket 16, which is driven by the timing chain 64.

The cam shaft supporting brackets 45, 46, 47 and 48 have adjustable split bearings to accommodate the respective journals on the adjusting shaft and permit free rotative movement thereof. The adjusting shaft 52 forms part of the lubricating oil distribution system and communicates with the oil supply furnished through the cylinder head casting 44, as shown in Figure 8, through the drilled passage 65 which provides communication for the drilled oil hole 66, throughout the arc of rotative movement of the adjusting shaft 52. In addition to supplying oil to the various bearing surfaces indicated in the drawings at Figures 6, 8 and 9, this shaft provides a continuous supply of fluid while the engine is operating to the hydraulic stabilizing mechanism hereinafter described.

Figure 5:
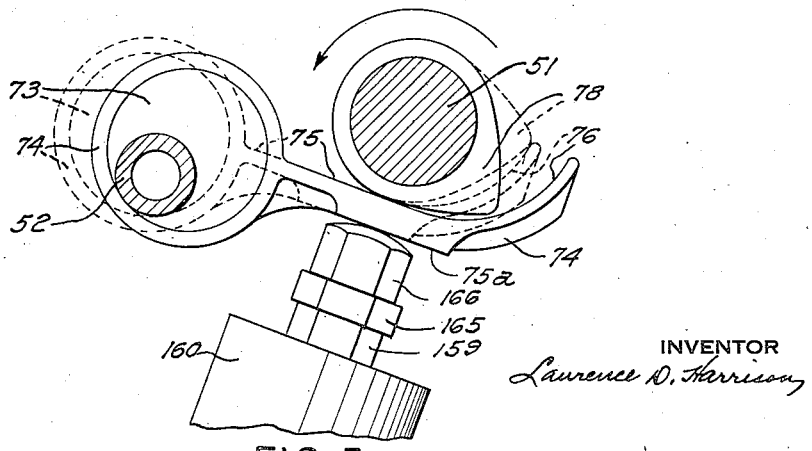
Figure 5 is a fragmentary sectional elevation taken substantially on lines 5—5, Fig. 1 drawn on an enlarged scale.

Referring particularly to Figure 9, on the adjusting shaft 52 are rocker arm journals 70, which are concentrically positioned and provided with depressions 68 in the sides thereof, and which support the exhaust valve rocker arm 71, which is retained in place thereon by the spring clip 72 and is provided with retaining impressions 69 engaging said depressions as shown in detail at Figures 21 and 22. Referring now to Figures 5 and 6, the journals 73 are eccentrically positioned on the adjusting shaft 52 and pivotally support the intake valve adjusting levers 74 which are interposed between the intake valve cams 78 and the intake valves 159.

Referring to Figure 5, the cam shaft 51 rotates counterclockwise in the direction of the arrow at this figure. The adjusting shaft 52 is rotative clockwise and counterclockwise within a predetermined arc, by means and in a manner hereinafter described. The rotative movement of the adjusting shaft 52, through the eccentrically positioned journal 73 thereon, imparts movement to the intake valve adjusting lever 74. The intake valve adjusting lever 74 is pivotally mounted on the eccentrically positioned journal 73 and has a flat cam contacting surface 75 adjoining the pivot end for primary engagement with the lobe of the intake cam 78 during the raising of said lifter and opening of the intake valve, this flat surface 75 terminates in an arcuate surface 76 curved in the direction of cam rotation for engagement with the lobe of the intake cam 78 during the receding of the lever lifter and closing of the intake valve, the radius of the arcuate surface 76 approximates the radius of the circle of gyration of the cam lobe travel of the intake valve cam 78 and may extend throughout an arc of one hundred degrees. On the opposite side of the lever from the flat cam contacting surface 75 and in a plane parallel therewith is a flat portion 75a adapted to transmit cam motion thereform to open and close the intake valve. Rotative movement of the adjusting shaft 52 imparts movement to the intake valve adjusting lever 74 which changes the lateral position thereof relative to the axis of rotation of the intake valve cam 78. This changes the number of degrees of rotation throughout which the lobe of the intake valve cam 78 maintains contact with the arcuate surface 76, during the receding of the lever lifter 74 and closing of the intake valve.

The motion imparted to the intake valve adjusting lever 74 at the eccentrically positioned journal 73 is arcuate, and as shown at Figure 5, will cause a deviation of the flat cam contacting surface 75 of approximately one and one-half degrees from its common plane at the two extreme positions in its arcuate movement. This angle of deviation of the flat cam contacting surface 75 has its apex located between two arcuate surfaces convexly opposed when the valve is at closed position, which are the intake valve cam circle 78 and the intake valve stem cap nut 166. This deviation, as herein concerned, is not sufficient to affect the proper operation of the valve when set with customary clearance and amounts to a variance in the opening of the intake valve which approximates three degrees of crankshaft rotation in a four stroke cycle engine.

Co-active with the intake valve adjusting levers 74, through operative attachment, and communication with, the adjusting shaft 52, are means hereinafter described, operative to move the adjusting levers 74 laterally relative to the axis of rotation of the intake valve cam 78, both manually and automatically, and operative to stabilize the adjusted positions of the adjusting levers 74, and control the rate of change of adjustment thereof.

On cam shaft 51 is formed exhaust valve cams 77, and intake valve cams 78; the cams being properly located to operate the respective valves in their proper sequence for a suitable firing order of the cylinders such as 1—2—4—3 for a four cylinder four stroke cycle engine.

Referring particularly to Figure 12 and Figure 16, attention is called to what I term a "variable force applicator," the rear cam shaft journal 79, is formed to provide arcuate passage 80 radiating from the center thereof, which provide guides to retain the balls 81 and coact therewith in imparting longitudinal movement to the sliding plunger 82, which is freely movable within its guide hole 83, centrally drilled in the camshaft 51 and communicates with the relief hole 84 and the lubricating oil passage 85, so arranged to impart the resultant force exerted by the balls 81 due to the centrifugal motion of the cam shaft 51, in a force that is longitudinally transmitted by the sliding plunger 82 to the pivoted lever arm 86 which, through contact with a top portion of the lever bolt 87, imparts a resultant rotative force to the adjusting shaft 52, the magnitude of which is indirectly dependent on the speed of revolution of the engine. Referring also to Figure 13, it will be noted that the lower portion of the lever bolt 87, when moved as above described, is free to move unobstructed within the guide sleeve 90, while the slot 88, cut in the bottom end of the lever bolt 87, permits free movement without contacting the pull wire 91.

Referring particularly to Figures 13 and 14, wherein Figure 14 is a manual pull rod mechanism suitable for mounting on an instrument panel 100, or a stationary portion of the engine frame, 101 is a handle attached to pull rod 102, to which is connected one end of the pull wire 91; the other end of the pull wire 91 being attached to the spring retaining plunger 92, Figure 13, wherein the compression spring 93 is shown extended to its free length and no pressure is exerted on the free plunger 94, which is slidable within the guide sleeve 90 and about the pull wire 91. It will be noted that when the pull rod 102 is withdrawn from the pull rod sleeve 103 any material distance, the lever spring 104 will engage with the ratchet teeth in the pull rod 102 retaining it in the selected position, whereon any resistance to rotative movement of the adjusting shaft 52 directly opposing movement of the free plunger 94 through the lower end of the lever bolt 87 will cause compression of the compression spring 93 and the stored energy therein can only be released by movement of the lever bolt 87 or the releasement of the pull rod 102. The latter may be accomplished by a twist of the handle which will disengage the lever spring 104 from the ratchet teeth and permit return to the original position. It can be seen from the foregoing that any movement of the lever bolt 87, either from the manual means or the automatic means hereinafter described, will impart rotative movement to the adjusting shaft 52 and thereby transmit lateral movement to the intake valve adjusting lever 74 through the eccentrically positioned journal 73.

Referring particularly to Figures 1, 2, 3, 10 and 11, near the forward end of the adjusting shaft 52 is operably connected the mechanism adapted to stabilize the adjusted positions of the intake valve adjusting levers 74 and control the rate of change of adjustment thereof, and co-actively, with the variable force applicator heretofore described and shown at Figure 12, automatically adjust the lateral position of the intake valve adjusting levers 74, by changing air pressure and by changing temperature of the engine and by changing speed of revolution of the engine. Incorporated with the automatic mechanism, manual means are provided to correlatively regulate the several automatic means in their cooperative function.

Referring particularly to Figure 10, the cylinder barrel 110 is rigidly attached to the supporting member 111, which is attached to the cam shaft supporting bracket 48 on a suitable mounting; all of which provide proper alignment of the cylinder barrel for the proper function of the unit. The top end of the cylinder barrel 110 is threaded to accommodate the cylinder cap 112, the threads of which are of such tolerance as to permit a slight leakage of a fluid such as lubricating oil. The central portion of the cylinder cap 112 is centrally depressed to provide for exhausting any air or gases from the cylinder that may enter or form therein. On the lower exterior of the cylinder barrel 110 is formed a multiple thread 199 which imparts a rapid advance to the multiple thread nut 113 which is operative thereon. The lower end of the cylinder barrel 110 is closed except for the centrally located opening to provide admission of the connecting pin 114 and is of such tolerance as provides for a close but freely slidable fit and will permit a slight leakage of a fluid such as lubricating oil. Slidably operable within the cylinder barrel 110 is a piston 115 skirted at both ends and having a central section in which is formed a cylindrical bore 120 horizontally across the piston 115, and adapted to provide free rotative and slidable movement of the ball end of the bolt 116, which is operative therein through the hole 106 in the side of the cylinder 110. The ball end bolt 116 is securely fastened to the adjusting shaft 52 which is drilled and formed to seat the bolt collar on the inner side thereof and the washer 117 and the nut 118 on the outer side thereof, forming a substantially tight joint with the bolt 116. In the ball end bolt 116 the oil channel 118 is centrally drilled longitudinally from the ball end, to a depth that will extend across the bore of the adjusting shaft 52 when assembled thereon, and oil communication holes 119 are drilled through the ball end bolt 116 intersecting oil channel 118 at a point coinciding with the bore of the adjusting shaft 52. This connects the cylindrical bore 120 of the piston 115 with the pressure lubrication system. The piston 115 has identical orifices 121 forming oil passages from the cylindrical bore 120 to its respective outer ends, from which it can be seen a continuous supply of lubricating oil under like pressure is furnished at both ends of the piston 115 when the engine is operating.

Therefore, it follows that rotative movement of the adjusting shaft 52 must be accompanied by the displacement of fluid contained in the cylinder barrel 110 through the orifices 121, and the dimensions of the orifices 121 directly affect the rate of displacement of the fluid and the rate of speed at which the adjusting shaft 52 can rotatively move.

Attached to the multiple thread nut 113 is a bellows carrying case 130, which is provided for attachment thereto by the screws 131 inserted in the slots 132. The bottom of the bellows carrying case 130 is provided with an opening therein which provides a convenient means for suitably affixing the closed base of the metallic bellows 133 in fixed union therewith, such as by soldering or rolling. To the open top of the metallic bellows 133 is securely affixed the metal cup 134 by rolling the open convolution of the bellows over the edge of the open end of the metal cup and suitably soldering thereto. This metallic cup 134 may be formed to extend into the interior of the bellows and provide a stop or limitation to the compression of the bellows to keep it within its proper working limits, if so desired. A hole is centrally formed in the base of the metal cup 134 to accommodate the connecting pin 114 which is soldered in place. All soldered connections to the metallic cup 134 are airtight and the interior of the metal bellows is evacuated to the desired absolute pressure prior to sealing, to secure the desired differential pressure within and without the metallic bellows 133.

Referring to Figure 11, from the bellows carrying case 130 is cut and formed the bearing 135 which is freely slidable on the connecting shaft 136, which forms an adjusting connection with the thermostatic bi-metal spiral 137 and is rigidly fastened thereto by means of the eye 138 provided therefor. Referring also to Figure 10, the central end of the thermostatic bi-metal spiral 137 is held secure in place at 139 by provision for such attachment in the cylinder head casting 44 by the cast lugs 107, and from which it is apparent that movement of the outer end of the thermostatic bi-metal spiral 137 will transmit, through the connecting shaft 136, rotative movements to the bellows carrying case 130, which is transmitted to the multiple thread nut 113, which imparts vertical movement to the metallic bellows 133 and the connecting pin 114.

The thermostatic bi-metal spiral 137 is located at the bottom of a well formed in the cylinder head casting 44, as indicated at Figures 10, 11, 19 and 20. One side of this well has a low side wall 141. The well is adapted to receive the drainage from leakage of lubricating oil furnished to the various mechanism on the cylinder head that may drain to the front of the engine. This oil, by the time it reaches the well, is of high temperature and will vary in temperature with variations in temperature of the cylinder head. The top of the wall 141 is of sufficient height to maintain the bi-metal spiral 137 submerged in hot oil. As indicated at Figure 10, it will be noted that the well is positioned where it is subjected to the hot liquid as it leaves the cylinder head casting 44 through the outlet 220, whereby a relationship of engine operating temperature is conducted to the thermostatic bi-metal spiral 137.

The upper end of the connecting pin 114 is slotted and, after insertion through the hole in the bottom of the cylinder 110 provided therefor, it passes through the conical end of the coil tension spring 122 and the conical washer 123. The slotted end of the connecting pin 114 is then spread to hold the conical washer 123 thereon and maintain a pivotally operable connection with the tension coil spring 122. The opposite end of the tension spring 122 is formed with a small eye centrally located and adapted to engage the pin end of the screw pin 124, which is threaded in the lower portion of the central section of the piston 115, whereby a yieldable connection is established between the piston 115 and the connecting pin 114. This mechanism I term a "stabilized speed-atmospherical-thermal regulator," and it can be seen that all of the adjusting movements pertaining to the measurement of the cylindrical volume of charge which is retained in the cylinder, are stabilized in position, and in position changing movement and the speed thereof regulated by the hydraulic mechanism, and that the stabilized speed-atmospherical-thermal regulator is coactive in conjunction with the variable force applicator in adjusting the volume of charge retained in the cylinder, to control the compression pressure occurring at the fixed point of ignition so as to maintain a high degree of operating efficiency under all operating conditions such as heretofore have been unattainable in a combustion engine.

However, it is conceived that for certain various special purpose engines, only certain adjusting elements or certain combinations of the adjusting elements may be necessary or desirable in the fulfillment of such special purpose for which such engines may be constructed. Therefore, it is to be understood that any of the adjusting elements or any combination of said adjusting and regulatory elements may be used separately or collectively in fulfillment of such special purpose engine requirements, and hereinafter such designations as "speed," "thermal," "atmospherical," and "stabilized," or hyphenated combinations thereof, are to be understood to include such mechanism as the terms imply, wherein "speed" refers to mechanism to vary the measurement of volume retained in the cylinder due to variations in speed of the engine; "thermal" refers to mechanism to vary the measurement of volume retained in the cylinder due to variations in temperature of the engine; "atmospherical" refers to mechanism to vary the measurement of volume retained in the cylinder due to variations in the pressure of the atmosphere, and "stabilized" means to include the hydraulic mechanism therewith. The "variable force applicator" is to be included in the "speed" designation, but not necessarily with the "thermal" and "atmospherical" designations unless so stated. "Thermal" or "atmospherical" designations, in combination with the manual mechanism, are to be understood to include the tension coil spring 122 and its conjunctive connections providing the yieldable connection therebetween, and it is here pointed out that the forces of cam contact with the intake valve adjusting lever 74, which are transmitted to the adjusting shaft 52, are directional and sufficient to properly tension the coil spring 122 in these combinations. When the "thermal" adjustment is not included in the adjusting mechanism employed, a lock nut 108 is used in conjunction with the multiple thread nut 113, as indicated by the dotted lines—Figures 10 and 11, which render the multiple thread nut 113 inoperative. When the "atmospherical" adjustment is not included in the adjusting mechanism employed, the connecting pin 114 may be affixed to the base of the bellows carrying case 130 in a like manner to which it is affixed to the metal cup 134 and as indicated by the dotted outline at Figure 11. When the "speed" adjustment is not included in the adjusting mechanism employed, the parts of the variable force applicator, otherwise unnecessary, may be omitted. It is to be understood that suitable substitute arrangements adapted to special purpose requirements may be employed singularly or collectively.

The clearance volume or compression space is formed in the cylinder head casting 44. This space may be of relatively small dimensions. The volume of the compression space is determined by the selection of the expansion ratio. Figure 17 shows the bottom view of the clearance volume pockets contained in the cylinder head casting 44, which is representative in outline of a compression space such as is used with an expansion ratio of the order of 1 to 25, and Figures 4, 6, 9 and 18 show the relative proportions of a clearance volume representative of an expansion ratio of 1 to 11. The exhaust valve 140 and the intake valve 150 are set at alternate angles from the horizontal, so that a pocket for each valve is formed within the compression space to bulk the major portion of the compressed charge adjacent to the spark plug holes 30 to permit burning the greatest volume of charge with the least distance of flame travel. This is entirely opposite to the head construction and spark plug placement in engines heretofore used.

Referring particularly to Figure 9, 142 is the exhaust valve seat, 143 the exhaust channel communicating with the exhaust manifold 54. 144 is a valve stem guide pressed into the cylinder head casting 44; 145 is a packing ring in a groove on the valve stem guide 144; 146 is the exhaust valve spring base; 147 is a packing ring in a groove on the exhaust valve spring base 146; 148 is a valve spring, and 149 is a valve spring retaining nut.

Referring particularly to Figure 6, 152 is the intake valve seat; 153 the intake channel communicating with the intake manifold 55; 154 is an intake valve stem guide pressed in the cylinder head casting 44; 155 is a packing ring in a ring grove on the intake valve stem guide; 156 is the intake valve spring base; 157 is a packing ring mounted in a ring groove in the intake valve spring base; 158 is an intake valve spring; 159 is a combination valve spring retaining nut and thrust piston; 160 is a thrust sleeve pressed in the cylinder head casting 44 and is provided with a relief hole 161.

Referring now to Figures 6, 7 and 9, the outer end of the valve stems of the exhaust valves 140 and the intake valves 150 are threaded for engagement with the threads in their respective valve spring retaining nuts 149 and 159. In the outer end of the valve stem a longitudinal groove 163 is formed in part of the threaded end portion to receive the lug 164 on the valve holding nut 165. The interior diameter of the valve holding nut 165 is such as will freely pass the exterior of the threads on the valve stem ends and the lug 164 is freely movable in the valve stem groove 163; the outer perimeter is of hexagon form. The cap nuts 166 are threaded for engagement with the valve stem threads. They have sufficient space in the domes thereof to permit adjustment of the valves allowing customary clearance for the proper operation of the valves, and together with the respective valve spring retaining nut and the interposed holding nut 165, a means is provided for frictionally locking the cap nut 166 directly on the valve stem in its adjusted position.

Referring particularly to Figure 9, the exhaust valve spring base 146 has a centrally located bore of such tolerance as to be easily slidable on the upper portion of the outer perimeter of the exhaust valve stem guide 144, which is suitably finished for such engagement and provided with the packing ring groove which holds the packing ring 145, the exterior perimeter of which makes operative contact with the centrally located bore of the valve spring base 146 to minimize oil leakage. The large diameter exterior perimeter of the valve spring base 146 is concentric with the centrally located bore thereof and is provided with a packing ring groove to accommodate the exhaust valve base packing ring 145 and is freely slidable within the bore 170 provided in the cylinder head casting 44 therefor. Near the bottom of the bore 170, the diameter is somewhat reduced and forms a stop or bearing surface 171 which limits the downward travel of the valve spring base 146. The small or reduced bore extends a little further into the cylinder head casting 44 in the formation of a pocket surrounding the exhaust valve stem guide 144 and together with the larger diameter bore intercepts the longitudinal oil channel 206, which is drilled in the core provided for same in the cylinder head casting 44, and which carries lubricating oil under pressure, and subjects the exhaust valve spring base to the fluid pressure of the lubricating system when the engine is operating. From which it can be seen that the area of the valve spring base 146 and the pressure of the fluid exerted thereon may be proportioned and adjusted respectively to a force that will exceed the force of the exhaust valve spring 148 when the exhaust valve 140 is at closed position and the engine not operating, and such excessive pressure will raise the valve spring base 146 off the seat 171 when the exhaust valve is at closed position, and impart a resilient action to the exhaust valve spring base 146 that will have a tendency to yield during compression of the exhaust valve spring and advance when such compression is released and will likewise yield to forces of vibration or inertia forces that may be transmitted thereto, dissipating and disrupting such forces and thereby preventing occurrence of spring surge.

Referring now particularly to Figure 6, the intake valve 150 is likewise provided with a resilient valve spring base 156 which is operative within the thrust sleeve 160 in a similar manner as above described for the exahust valve, and provides additional side thrust at the top of the valve stem through the slidable engagement of the top interior surface of the thrust sleeve 160 and the skirt of the combination valve spring retaining nut and thrust piston 159, thus providing for the lateral force that may be imposed on the cap nuts 166 by the lateral movement of the intake valve adjusting levers surface 75a.

Referring particularly to Figure 5, the cam shaft 51 rotates in a counter clockwise direction as indicated by the arrow in this figure. It is to be understood that the intake cam 78 is of such proportions that it will hold the intake valve in an open position throughout the entire intake stroke, when operation is with the intake valve adjusting lever 74 in the position as shown in solid lines, and that the adjustment of the closing point of the intake valve is varied over a portion of the stroke commonly termed the compression stroke, and that when operation is with the intake valve adjusting lever 74 in the position as shown in dotted lines, that the intake valve has been held open throughout the intake stroke and a considerable portion of the compression stroke. From which it can be understood that operation of this engine is not determined by the volume of the charge that enters the cylinder, but by the volume of the charge that is retained in the cylinder, and that any excess volume of charge that may be admitted to the cylinder by the carbureter throttle valve, that would normally cause detonation if the entire charge were retained in the cylinder, will be extruded during the early part of the compression stroke through the intake port and transferred to an adjacent cylinder for admission. As shown at Figure 5, the variation in the lateral position of the intake valve adjusting lever 74, as shown in the solid lines and as shown in the dotted lines, is provided by rotative movement of the adjusting shaft 52 through an arc of sixty degrees and the resultant closing points of the intake valve are thereby varied over approximately 35 degrees of cam rotation therefrom, which in a four stroke cycle engine equals 70 degrees of crankshaft travel. For example, if the timing of the intake valve with the adjusting lever in the position as shown in solid lines, in cooperation with a cam of the general outline as the cam 78, were used, and the cam representing 230 degrees of crankshaft travel, was timed to open the intake valve 10 degrees before top center and close the intake 40 degrees after bottom center, which is considered good practice for maximum induction, it can be understood that the position of the adjusting lever 74, as shown in dotted lines, would then represent a closing point of the intake valve when the piston had reached a point corresponding to 110 degrees after bottom, and would thereby retain in the cylinder a volume of charge approximating 39 per cent of the piston displacement. This volume of charge gives excellent results for slow speed operation with an expansion ratio of eleven to one when the atmospheric pressure is approximately one atmosphere and the engine is cool. When the engine becomes hot, the heat imparted to the charge expands it and it is necessary to retain an additional volume of the rarefied charge to compensate for the expansion thereof. Likewise, if the atmospheric pressure decreases, as is the case with increasing altitude, the rarefied charge must be compensated for by retaining an additional volume of the rarefied charge. Further, with increasing speed of revolution of the engine the time available to burn the charge from the fixed point of ignition rapidly decreases, and to compensate for the limitations of time, faster burning characteristics are imparted to the charge by raising the compression pressure at the point of ignition and reducing the percentage of residuum gas of the charge, by retaining in the cylinder increasing volumes of charge as the speed of revolution of the engine increases.

In order to accomplish these adjustments and at the same time keep the dimensions of the mechanism used therefor in practical limits, adjusting forces of small magnitude are employed. The contact of the cam 78 with the adjusting lever 74 imparts a force thereto which tends to move it laterally away from its point of support. This force is transmitted to the adjusting shaft 52 through the eccentrically positioned journal 73 and normally would turn the adjusting shaft 52 in a clockwise direction to a position that would be out of adjustment and retain too large a volume of charge in the cylinder and cause detonation of the charge and pre-ignition at certain time from excessive compression pressures, if unrestrained. The magnitude of this force is greatest at the slowest speeds of engine revolution with the intake valve adjusting lever 74 wherein cam contact with the arcuate surface 76 is at a maximum. To reduce this periodic force of varying frequency to subordination of the forces of the adjusting mechanisms which transmit constant forces, I use the hydraulic means included in the adjusting mechanism shown at Figure 10, and heretofore described.

The mechanism shown at Figure 12, and heretofore described, also applies force to the adjusting shaft 52 to rotatively move it in a clockwise direction. This force is a constant force which increases in intensity with increasing speed of revolution of the engine.

Referring particularly to Figure 10 and Figure 11, it is to be understood that when the engine is in operation there is constant active force applied to the adjusting shaft 52, as above described, rotatively clockwise. This mechanism co-actively limits the clockwise movement of the adjusting shaft 52 and rotatively moves it counter clockwise, and thereby adjusts the lateral position of the intake valve adjusting levers 74 that are pivotally mounted on the eccentrically positioned journals 73. Figure 10 represents the mechanism with the engine at rest and a minimum of temperature and pressure of one atmosphere. The tension coil spring 122 is wound with initial tension; it is the principal yielding member to increasing speed of engine; it is subordinate in force to the thermostatic bi-metal spiral 137 and the metallic bellows 133; it is also subordinate to the force of the compression spring 93, Figure 13; it is the principal yielding member to the manual control mechanism. From which it can be understood that with the engine operating at moderate speed the tension spring 122 will yield to the extent of counteracting the force applied by the variable force applicator due to the engine speed, and that if at such speed conditions are encountered to cause undue heating of the engine, the rotative action of the thermostatic bi-metal spiral 137 will move the multiple thread nut 113 on its companion thread 109, thereby raising the adjusting portion of the unit attached thereto by the screws 131, which may result in the position as shown in Figure 11, and it can be understood that with such vertical movement resulting therefrom, the constant force that tends to rotate the adjusting shaft clockwise remains substantially constant throughout this movement and at the advanced position of the adjusting shaft 52, and it also can be understood that if at these above operating conditions, a higher elevation is encountered causing a decrease in atmospheric pressure, that the metallic bellows 133 will expand and thereby impart additional upward movement to the pin 114, which allows further advancement clockwise of the adjusting shaft 52 to take place by reason of the same substantially constant pressure applied to rotatively move the adjusting shaft clockwise. It further can be understood that encountering a lower altitude with the corresponding higher pressure atmosphere, and the engine attaining a lower operating temperature, the converse actions therefrom will cause the adjusting shaft 52 to rotatively move counter clockwise while the clockwise rotative force remains substantially constant, and that a slower speed of engine revolution will diminish the force tending to clockwise rotative movement, and that the tension spring 122 will rotatively move the adjusting shaft 52 counter clockwise to a point where the tension spring 122 balances the reduced force that is diminished by reduced speed. It is also apparent that the mechanical advantage afforded by the multiple thread nut 113 is such as to permit rotative movement thereof due to the force imposed by the thermostatic bi-metal spiral 137, and at the same time afford the thermostatic bi-metal spiral 137 a mechanical advantage in resisting rotative movement of the multiple thread nut 113 due to vertical force that may be indirectly imposed thereon from tension within the coil spring 122. It is further apparent that the differential air pressure within and without the metallic bellows 133 may be of considerable magnitude, but this condition is not reflected in such magnitude to any other elements of the adjusting mechanism, but represents a self-contained force wherein the bellows 133 is under compression from the exterior atmospheric pressure.

It also can be understood that the connecting shaft 136 establishes a fixed rotative relationship of the metal bellows carrying case 130 with the eye 138 in the thermostatic bi-metal spiral 137, and that it is necessary to establish a coordinated stress between the coactive adjusting members, which might be said to pre-load the active adjusting members; the tension coil spring 122, the metal bellows 133, and the bi-metal spiral 137 to the extent of eliminating a delicate balance of force that would exist within the bi-metal spiral 137 at free position, and a delicate balance of force that may occur in the metal bellows 133, if evacuated to a pressure that would be such as not to exceed the maximum deflection of the bellows wherein no stop were used to prevent excessive deflection thereof. It is also necessary to provide means for varying the magnitude of this above mentioned pre-load resistance when adjusting the engine for proper performance, or when "tuning up the engine." This is accomplished by loosening the screws 131 that hold the carrying case 130 which permits of rotative movement of the multiple thread nut 113 without rotatively affecting the carrying case 130, and of rotative movement of the carrying case 130 without affecting the vertical position of the multiple thread nut 113, from which it can be understood the above mentioned adjustment and regulation can be accomplished thereby.

Referring now to Figures 10, 12, 13 and 14, it is desirable when starting a cold engine to raise the compression pressure to compensate for the heat extracted from the compressed charge by the cold metal parts of contact therewith, so that high pressures conductive to positive ignition and fast flame travel can be had. This I accomplish by means of the manually operated mechanism heretofore described, from which it can be understood that withdrawal of the pull rod 102 causes movement of the retaining plunger 92 through its connection therewith by the pull wire 91. Oil that may be retained in the cylinder 110 must be displaced through the orifices 121, to permit movement of the mechanism adjusting the intake lever 74, Figure 5, to a new position to permit retaining a charge of larger volume in the cylinder to raise the compression pressure. This displacement is not immediate and it can be understood that withdrawing the pull rod 102 and fixing the position thereof by engagement of the spring 104 with a ratchet tooth in the pull rod 102 will compress the spring 93 and the stored energy therein will cause clockwise rotative movement of the adjusting shaft 52 at a rate allowed by the oil displacement through the orifices 121, and thus relieve the necessity of a constant manual pull being exerted on the pull rod 102 for the duration of the period required for such movement, and as heretofore pointed out, the force of the compression spring 93 is in excess of the resisting force of the tension coil spring 122, the latter will yield until a balance of pressure is reached. This provides a convenient means for adjusting the charge for starting and provides manual means that is dominant over the automatic means at any and all times. It is further pointed out that this mechanism is expressly used for the purpose of regulating the minimum volume of charge that may be retained in engines of various expansion ratios, and consequently of different power output with corresponding variance in thermal efficiency. These I term "series engines," being identical in all respects except the clearance volume in the cylinder head, from which it can be seen that by changing the relative position of the retaining plunger 92 on the pull wire 91, a new position for the adjusting bolt 87 will be established for that shown in solid lines at Figure 13, and that when moved toward the position of the adjusting bolt 87, as shown in the dotted lines, the relative lateral position of the intake valve adjusting lever 74 will have been indirectly laterally altered to retain a large minimum volume in the cylinder, whereupon the automatic mechanism is coactively adjusted manually, as heretofore described, in accordance with this new condition, wherein the pre-loaded force therein is counterbalanced by a force set up in the compression spring 93. It can be understood that herein the relative volume of the compression space in the cylinder head is so small that a variation of several ratios of expansion may be had from a single cylinder head casting by using spark plug holes of generous size, and in conjunction therewith, variations in the type of spark plugs, so that the spark plugs may displace varying volumes therewith, and in finish of the interior of the compression space, and with reasonable thickness change in the cylinder head gasket wherein a separate cylinder head is used.

To compensate for this change of minimum volume accompanying the change in expansion ratio of an engine, in conjunction with an identical "stabilized speed-atmospherical-thermal regulator," an adjustment of volume regulation thereto may be effected by laterally positioning the longitudinal axis of the cylinder barrel 110 relative to the adjusting shaft 52 in conjunction with the bracket 111 or with shims, or by changing the position of the collar on bolt 116, so that the arcuate movement of the ball end bolt 116 is effected with a changed radius to correspond with the change in minimum volume, so that as the minimum volume to be retained in the cylinder is reduced, the effective radius of arcuate movement of the ball end bolt 116 is increased relative to actuation thereof by the "stabilized speed-atmospherical-thermal regulator" so that identical responsive action of the adjusting elements therein effect their respective adjustments conjunctively with the intake valve lever lifter 74 in a correspondingly reduced relationship. It is here pointed out that the ball end of the ball end bolt 116 in its arcuate movement does not laterally traverse the entire length of the cylindrical bore 120; sufficient length being provided in the said bore for this position change to be effected.

Means for the supply of lubrication, heretofore described, is furnished to the horizontal channel 202, indicated by the dotted lines at Figure 2, through oil channel 200 and 201. Figure 4 indicates a means of supplying the bearing surfaces within the crankcase proper with lubricating oil from the channel 202, which extends longitudinally back to a cross channel 203, Figure 1, which in turn, connects with a vertical riser channel 204, Figure 1, which is centrally positioned and with a hole provided in the head gasket forms communication with the vertical riser channel 205 drilled in the cylinder head casting 44, which intersects the channel 206 drilled longitudinally and centrally located in the cylinder head.

Referring to Figures 17, 18, 19 and 20, near the front of the cylinder head casting 44, an angularly descending channel 207 is drilled in a core provided therefor which intersects the channel 206 and also a horizontal cross channel 208. This cross channel leads to a relief valve wherein 212 is a ball seated in the casting on a seat provided therefor; 213 is a compression spring and 214 an adjusting screw locked in position with the nut 215; 211 is an outlet hole directing the oil that passes the relief valve back to the crankcase over the timing gears and timing chain. It will be noted that the relief valve is provided at the termination of the lubrication system. It can be understood that this provides for the maintenance of pressure on the valve spring bases, and it is pointed out that the relief valve is of comparatively small dimensions, which with adjustment of the spring 213 provides for a substantial rise in the pressure in the lubricating system with increasing speed of revolution of the engine, thereby raising the pressure on the valve spring bases.

This engine is capable of extremely high speed of revolution. It is at very high operating speeds where valve spring breakage often occurs due to vibrating forces within the valve springs. Also, it is very desirable at high operating speeds to have increased valve spring pressures to effect fast closing of the valves, which at slow speed would be unnecessary and cause undue wear and strain on the valve actuating mechanism. It can be understood that the valve spring bases as used herein and heretofore described, provide resiliency which will absorb the vibrating forces that may be transmitted to the valve spring bases, and that as the engine speed is increased and a greater volume of lubricant is furnished to the lubricating system by the oil pump 26, it will cause an increased pressure within the distribution system to pass the additional supply that is not required through the relief valve which will increase the pressure on the valve spring bases and thereby compress the valve springs slightly at closed positions of the valves in counterbalancing this additional pressure, and it can be understood that in operation, the valve spring pressure diminishes as the valve approaches the closed position, and that it is in this range of minimum stress that the additional pressure furnished the valve spring, through the hydraulic pressure on the valve spring bases, becomes most effective.

The chart at Figure 23 is set forth to graphically convey the conception of this highly efficient engine and furnish a relative comparison of compression pressures with an ordinary engine. Compression and expansion curves are an interpolation of points taken from straight line logarithmic plots of small scale wherein $n$ equals 1.3. The compression pressures are below actual working pressures wherein heat is imparted to the charge during compression but form a basic comparison. The peak expansion pressures and the degree of occurrence thereof are assumed, guidance thereof being solely on impression formed from experiments. The solid line curves are considered fairly representative for an engine with an expansion ratio of 1 to 11 as shown in the drawings; due allowance being made for the peak pressures and the occurrence thereof, wherein compression curves D, E, and F, and expansion curves G, H, and J represent operation on a charge of which the volumetric efficiency is 34 percent, 43 percent and 51 percent respectively. It is here pointed out that there is a charge of certain volumetric efficiency that can be used with the minimum speed, and that charges of larger volumetric efficiency become available for use only when increasing operating speeds permit. Operation on volumes representing a volumetric efficiency below that set for the maximum at a particular speed is obtained by restriction to admission with the carbureter throttle valve.

The circles on curves D, E, and F represent points of ignition. The dotted compression curves, Figure 23, are considered relatively representative for an ordinary engine with a compression ratio of 6 to 1 wherein curve A represents compression of a charge of a volumetric efficiency of 34 percent; curve B a charge equalling 51 percent volumetric efficiency, and curve C representative of 85 percent volumetric efficiency which approximates the maximum. Compression curves A and D give representative compression of charges of like volumetric efficiency and curves B and F are of like volumetric efficiency. It is pointed out that the residuum gas mixed with these charges, based on the volume of the compression space, would be twice as much in the ordinary engine.

It is generally recognized that the percentage of residuum gas mixed with the fresh charge effects the rate of burning of the charge, and that the initial slow burning period can be materially shortened by igniting the charge at a higher compression pressure, and that in the burning of the charge the velocity of flame travel is the chief factor affecting the rate of the pressure rise.

Flame travel is generally termed in slow burning and fast burning stages, which resolves into rates of burning in relation to temperature and pressure wherein at low pressure and temperature burning is very slow and at high pressure and temperature burning is very fast.

The element of time also has a relationship to the pressure and temperature in the burning of the charge to the extent that when the charge is maintained at a certain high temperature and pressure for a certain period of time the remaining unburned portion of the charge will instantaneously ignite. This is known as detonation or ping and is very detrimental to an engine and is accompanied by a serious loss of power. This relationship is recognized to the extent that as the burning time is reduced the maximum pressure and temperatures can be increased. The best testimony of this relationship is the ordinary engine of present day manufacture of a fixed type of engine wherein the compression ratio decreases as the size of the cylinders increase. Therefore, to effect a material increase in the maximum pressure and temperature that is attained in a combustion engine of the constant volume type, a material decrease in the time required to burn the charge must be provided.

Ordinary engines capable of what is considered high speed, such as present day high speed automobile engines, provide for ignition that varies over a considerable portion of the compression stroke as the piston approaches top center. The maximum advance points of ignition for such engines may occur when the piston has traveled not less than 70 to 85 percent of the distance of the compression stroke.

I have provided an engine wherein the time required to burn the charge is greatly reduced. Ignition occurs at a fixed point corresponding with the expansion ratio of the engine. In an engine with an expansion ratio of the order of 1 to 25, ignition does not occur until the piston has traveled not less than 99 percent of the distance of the compression stroke. In an engine with an expansion ratio of the order of 1 to 11 ignition does not occur until the piston has traveled not less than 97 percent of the distance of the compression stroke. In an engine with an expansion ratio of the order of 1 to 7 ignition does not occur until the piston has traveled not less than 95 percent of the distance of the compression stroke. These fixed points of ignition in the proximity of top center are suitable for engines of such cylinder dimensions as are capable of high speed and as the cylinder size is reduced the point of ignition approaches top center for engines of the same expansion ratio.

By fixing the point of ignition at a given degree of revolution and cooperating with the engine, which is very insistent on the time element as regards its speed of revolution, by supplying the charge in such amounts that will efficiently burn to a high pressure and temperature within the time provided by the engine in passing through a given arc of revolution, a very high degree of operating efficiency can be maintained.

In the ordinary engine, such as are used in automobiles, at high rates of speed wherein a substantial drop in pressure is present in the induction system, maximum advance points of ignition are provided that may occur 40 to 60 degrees before top center, or in other words, the extreme conditions might be stated, ignition is provided that may occur when the volume in the cylinder has been compressed to equal 250 percent of the compression space, or ignition is provided that may occur at a point requiring the piston to travel 30 percent of the distance on the compression stroke against excess pressure caused by burning of the charge which is in excess of compression pressure and the work required to overcome the additional pressure must be supplied by expansion of the charge and represents a net loss in power and causes additional stress and wear on certain working parts, subjects the metal areas confining the charge to additional heat and prolongs the period for loss of heat thereto.

When an ordinary engine is operated at maximum throttle opening with no load and attains its maximum speed, the speed of revolution thus attained is likely to be at the maximum degree of advance provided for the ignition of that engine, and this maximum speed represents the individual engine's abilitiy to burn its charge and provide pressure on the piston to force it down within a given length of time, and it can be recognized that if it were possible to burn the charge materially faster, or in a much shorter period of time, the spark could be retarded from its advanced position and occur nearer to top center, cause a higher peak pressure to occur nearer to top center on the expansion stroke and provide a greater force of expansion with less after burning which would further increase the speed thereof, and that in so doing it would convert more of the potential heat contained in the charge into useful work as the charge inducted would decrease in volumetric efficiency with the additional speed. If this failed to convert more of the potential heat contained in the charge into useful work the speed of the engine would not increase.

In experimenting with engines operating with a fixed degree of ignition and means to increase the volume of the charge to compensate for the induction deficiencies that occur in operation, I used a small single cylinder four stroke cycle, L head type engine, air cooled, flywheel magneto, the ignition being at a fixed point when operating, fuel was supplied with a mixing jet on the intake, the spark plug was located at the outer edge of the intake valve pocket and required two and one-half inches flame travel to the outer edge of the exhaust valve pocket, the cylinder head and piston were aluminum alloy, the bore was one and three-quarters inches and the stroke one and seven-eighths inches, the expansion ratio was 1 to 11, and the volume of charge that could be retained in the cylinder varied in volumes equalling from 40 to 63 percent of the piston displacement, the timing cam was located on the crankshaft and the ignition breaker points were set to commence opening at 10½ degrees before top center and they were fully open at 4 degrees before top center. This engine gave excellent results at all speeds and on a spurt speed test attained a speed of 9486 revolutions per minute and at no time at any speed was there any flame present in the exhaust. The compression space was of very poor design which was necessary to provide the expansion ratio, having a very shallow channel connecting the valve pocket with the cylinder which undoubtedly had a restricting influence on the performance, especially at high speed.

A multiple cylinder engine of this type direct connected to an air compressor, the engine having a bore and stroke of $3\frac{1}{16}$ x $3\frac{7}{8}$ inches and using a somewhat smaller expansion ratio, indicates that performance on a charge of 40 percent volumetric efficiency at slow speed will equal the slow speed performance of the ordinary engine on full charge, and that increasement of speeds up to approximately 1200 revolutions per minute with the corresponding increasement in volumetric efficiency of the charge permissible for such speeds will greatly surpass the performance of the ordinary engine at like speeds on full charge.

In these experiments gasoline sold under the trade names of Ethyl gasoline and Third Grade White were used. Best results are obtained with Third Grade White.

It is considered that mechanism adapted to regulation from changing conditions within the intake system is well within the scope of this invention. However, such is inferior to the means shown in the drawings due to similarity of conditions that may occur within the induction system under vastly different operating conditions.

It can be recognized that I have provided an engine that will give highly efficient operation at all speeds and load conditions encountered within a vast range of altitude and temperature that has heretofore been unattainable. While it is the primary purpose to provide a highly efficient atmospheric induction engine, this engine utilizing pressure induction or supercharging can maintain correspondingly high efficiencies to greater altitudes, and attain greater speeds thereby.

It is also pointed out that wherein a single cylinder engine is used or a multiple cylinder engine wherein there is not a constant induction by a cylinder, an extension on the carbureter intake with a capacity to retain the gases that may be extruded from a cylinder at a time when induction is not in progress by another cylinder, and the volume of charge admitted exceed the volume which can be retained, will suffice to prevent the air-fuel mixture being wasted. This may be in the form of an air cleaner.

Having now fully described my engine and explained its use, I realize that to those familiar with the art various changes and modifications may be made, all of which, however, may well remain within the spirit of the invention. Therefore, I wish to be bound only by the following claims.

I claim:

1. In an internal combustion engine having a cylinder piston operative therein, an intake valve, an exhaust valve, a cam shaft, an operative connection between the valves and the cam shaft, and means for varying the amount of fuel to be compressed in the cylinder including a pivotally mounted valve lifter interposed between the operative end of the intake valve and the intake cam, having a flat surface adjacent the axis of pivot with a curved surface extending arcuately therefrom in the direction of cam rotation, together with means for adjusting the longitudinal position of said valve lifter whereby the cam will contact either said flat surface or varying portions of said curved surface during its rotation so that the time of closing of the intake valve may be adjustably varied during operation while the time of opening will remain substantially fixed, said means for longitudinally adjusting said valve lifter including an eccentrically mounted journal on a valve adjusting shaft, together with means for actuating said valve adjusting shaft during the operation of said engine including mechanism responsive to the speed of said engine mechanically connected so as to accelerate the closing of said intake valve as the speed of said engine increases, mechanism responsive to atmospheric pressure interconnected with said speed responsive mechanism to accelerate the closing of said intake valve as atmospheric pressure decreases and mechanism interconnected with both said devices to advance the closing of said intake valve as the heat of the engine increases.

2. An internal combustion engine having a cylinder with a head, a rotative drive shaft, a piston operable in said cylinder and operable to rotate said drive shaft, means to exhaust said cylinder, an intake valve operable in conjunction with said cylinder, a cam operable to open and close said intake valve in conjunction with an interposed lever valve lifter, a pivotally supported eccentrically positioned journal adapted to rotative movement within a predetermined arc and operable to swingably support and laterally move the lever valve lifter, said lever valve lifter comprising a lever swingably supported on said journal and operable in conjunction with said cam and adapted to maintain operative contact with the lobe of said cam throughout varying degrees of said cam rotation during the receding movement of said lifter by changing the position of said supporting journal relative to the axis of rotation of said cam, the lever portion of said lifter extending from said journaled end having a flat cam contacting surface for primary engagement with the lobe of said cam and during the lifting of said lever valve lifter and a curved arcuate cam contacting surface deviating therefrom in the direction of cam rotation for engagement with said cam lobe during the receding movement of said lifter and a flat portion on the opposite side from said flat cam contacting surface and in a plane parallel therewith adapted to transmit said cam lobe action to said intake valve, engine temperature responsive means operatively connected with said cam to vary the degree of cam action on the lifter during the receding movement of said lifter.

3. In an internal combustion engine of the type described, as a sub-combination, a pivotally supported eccentrically positioned journal adapted to rotative movement within a predetermined arc and operable to swingably support and impart a lateral movement to a lever valve lifter, a one piece lever valve lifter swingably supported on said journal and operable in conjunction with a cam and adapted to maintain operative contact with the lobe of said cam throughout varying degrees of said cam rotation during the receding movement of said lifter by changing the position of said supporting journal relative to the axis of rotation of said cam, the lever portion of said lifter extending from said journaled end having a flat cam contacting surface for primary engagement with said cam lobe and during the lifting of said lever valve lifter and a curved arcuate cam contacting surface deviating therefrom in the direction of cam rotation for engagement with said cam lobe during the receding movement of said lifter and a flat portion on the opposite side from said flat cam contacting surface and in a plane parallel therewith adapted to operate a valve, and mechanism operable to change the position of said supporting journal with a change in temperature of said engine.

4. In an internal combustion engine of the type described, as a sub-combination, a pivotally supported eccentrically positioned journal adapted to rotative movement within a predetermined arc and operable to swingably support and impart lateral movement to a lever valve lifter, said lever valve lifter comprising a lever swingably supported on said journal and operable in conjunction with a cam and adapted to maintain operative contact with the lobe of said cam throughout varying degrees of said cam rotation during the receding movement of said lifter by changing the position of said supporting journal relative to the axis of rotation of said cam, the lever portion of said lifter extending from said journaled end having a flat cam contacting surface for primary engagement with said cam lobe and during the lifting of said lever valve lifter and a curved arcuate cam contacting surface deviating therefrom in the direction of cam rotation for engagement with said cam lobe during the receding movement of said lifter and a flat portion on the opposite side from said flat cam contacting surface and in a plane parallel therewith adapted to operate an intake valve, mechanism operably responsive to change the position of said supporting journal with a change in speed of revolution of said engine, and hydraulic mechanism adapted to subdue the forces of said cam engagement with said lifter, thereby stabilizing the adjusted positions of said supporting journal.

5. In an internal combustion engine comprising a cylinder, a piston operating in said cylinder, an intake valve, an exhaust valve, a cam shaft and an operative connection between the cam shaft and the intake and exhaust valves for actuating said valves, and means operatively connected to the intake valve operative connection to vary the rejection of a predetermined portion of a fuel charge in accordance with the engine speed.

LAURENCE D. HARRISON.